(12) United States Patent
Hickman et al.

(10) Patent No.: US 8,966,356 B1
(45) Date of Patent: Feb. 24, 2015

(54) PROVIDING VIEWS OF THREE-DIMENSIONAL (3D) OBJECT DATA MODELS

(75) Inventors: Ryan Hickman, Mountain View, CA (US); Thor Lewis, San Francisco, CA (US)

(73) Assignee: Google Inc., Mountain View, CA (US)

( * ) Notice: Subject to any disclaimer, the term of this patent is extended or adjusted under 35 U.S.C. 154(b) by 176 days.

(21) Appl. No.: 13/558,466

(22) Filed: Jul. 26, 2012

Related U.S. Application Data

(60) Provisional application No. 61/673,577, filed on Jul. 19, 2012.

(51) Int. Cl.
*G06F 17/00* (2006.01)

(52) U.S. Cl.
USPC ............................ 715/208; 715/205; 715/230

(58) Field of Classification Search
CPC .......... G06F 17/2235; G06F 17/30867; G06F 17/3089
USPC ......... 715/200, 205, 206, 207, 208, 230, 233, 715/273, 255
See application file for complete search history.

(56) References Cited

U.S. PATENT DOCUMENTS

| | | | |
|---|---|---|---|
| 2008/0162231 A1* | 7/2008 | Kahle et al. | 705/7 |
| 2009/0247250 A1* | 10/2009 | Kato et al. | 463/2 |
| 2010/0103244 A1* | 4/2010 | Brandsma et al. | 348/14.08 |
| 2011/0102469 A1* | 5/2011 | Kami et al. | 345/682 |
| 2011/0221745 A1* | 9/2011 | Goldman et al. | 345/419 |
| 2011/0304617 A1* | 12/2011 | Nishida et al. | 345/419 |
| 2012/0110076 A1* | 5/2012 | Su et al. | 709/204 |
| 2012/0141023 A1* | 6/2012 | Wang et al. | 382/162 |
| 2012/0144423 A1* | 6/2012 | Kim et al. | 725/39 |
| 2012/0240053 A1* | 9/2012 | Shriber et al. | 715/749 |

OTHER PUBLICATIONS

Autodesk 123D Catch, Catch and carry, Turn ordinary photos into extraordinary 3D models, www.123dapp.com/catch, retrieved Jan. 2013, pp. 1-3.

* cited by examiner

*Primary Examiner* — Stephen Hong
*Assistant Examiner* — Gregory J Vaughn
(74) *Attorney, Agent, or Firm* — McDonnell Boehnen Hulbert & Berghoff LLP

(57) ABSTRACT

A method includes providing a first Web page including an embedded viewer configured to render a three-dimensional (3D) object data model representing an object to present a first 3D view of the object. The embedded viewer can receive input to change the first 3D view of the object to a second 3D view of the object. The method includes receiving a request to provide the second 3D view of the object. The method includes generating a first uniform resource identifier (URI) that includes view information. The view information is a part of the URI and represents a plurality of rendered features of the second 3D view. The method includes providing, in response to receiving a request based on the first URI, a second Web page including an embedded viewer configured to render the 3D object data model according to the view information to present the second 3D view.

19 Claims, 11 Drawing Sheets

PROVIDING VIEWS OF THREE-DIMENSIONAL (3D) OBJECT DATA MODELS

CROSS-REFERENCE TO RELATED APPLICATIONS

This application claims the benefit of U.S. Provisional Application No. 61/673,577, filed on Jul. 19, 2012, the entirety of which is incorporated herein by reference.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, and curved surfaces. Various techniques exist for generating 3D object data models utilizing, for example, point clouds and geometric shapes.

Being a collection of data, a 3D object data model can be created by hand, algorithmically, or based on scanned objects, for example. As an example, an artist may manually generate a 3D image of an object that can be used as the 3D model. As another example, an object may be scanned from a number of different angles, and the scanned images may be combined to generate the 3D image of the object. As yet another example, an image of an object may be used to generate a point cloud that may be algorithmically processed to generate the 3D image.

3D object data models may include solid models that define a volume of the object, or may include shell or boundary models that represent a surface (for example, the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

SUMMARY

This disclosure relates to methods and systems for providing views of three-dimensional (3D) object data models.

The disclosed methods may be provided in a form of instructions stored on a non-transitory, computer-readable medium or memory, that when executed by a computing device, causes the computing device to implement the methods. Further examples may include articles of manufacture including tangible computer-readable media having computer-readable instructions encoded thereon, and the instructions may comprise instructions to perform functions of the disclosed methods.

The computer-readable medium may include a non-transitory computer readable medium, for example, such as computer-readable media that stores data for short periods of time like register memory, processor cache, and random access memory (RAM). The computer-readable medium may also include non-transitory media, such as secondary or persistent long term storage, like read only memory (ROM), optical or magnetic disks, or compact-disc read only memory (CD-ROM), for example. The computer-readable media may also be any other volatile or non-volatile storage system. The computer-readable medium may be considered a computer-readable storage medium, for example, or a tangible storage medium.

In addition, circuitry may be provided that is wired to perform logical functions in any disclosed methods.

In still further examples, any type of devices may be used or configured to perform logical functions in any disclosed methods.

In yet further examples, any type of devices may be used or configured as means for performing functions of any of the disclosed methods (or any portions of the disclosed methods).

In some examples, a method comprises providing a first Web page including an embedded viewer configured to render a 3D object data model representing an object to present a first 3D view of the object, wherein the embedded viewer is operable to receive input to change the first 3D view of the object to a second 3D view of the object. The first 3D view is different from the second 3D view. The method of these examples comprises receiving a request to provide the second 3D view of the object. The method of these examples comprises generating a first uniform resource identifier that includes view information. The view information is a part of the first uniform resource identifier. The view information represents a plurality of rendered features of the second 3D view of the object. The method of these examples comprises providing, responsive to receiving a request based on the first uniform resource identifier, a second Web page including an embedded viewer configured to render the 3D object data model according to the view information to present the second 3D view of the object.

In some examples, a system comprises one or more databases storing a first Web page including an embedded viewer that is configured to render a 3D object data model representing an object to present a first 3D view of the object, wherein the embedded viewer is operable to receive input to change the first 3D view of the object to a second 3D view of the object. The system of these examples comprises a communication interface configured to receive a first request to provide the second 3D view of the object and configured to receive a second request based on the first uniform resource identifier. The system of these examples comprises one or more non-transitory computer-readable media storing instructions that, when executed by one or more processors, cause the one or more processors to at least (1) in response to the communication interface receiving the first request, send a first uniform resource identifier to the communication interface, wherein the first uniform resource identifier includes view information corresponding to a plurality of features associated with the second 3D view of the object, and (2) in response to the communication interface receiving the second request, send the first Web page to the communication interface such that the embedded viewer renders the 3D object data model according to the view information to present the second 3D view of the object.

The foregoing summary is illustrative and is not intended to be in any way limiting. In addition to the illustrative aspects, embodiments, and features disclosed above, further aspects, embodiments, and features will become apparent by reference to the figures and the following detailed description.

DETAILED DESCRIPTION

The following detailed description includes references to the accompanying figures. In the figures, similar symbols typically identify similar components, unless context dictates otherwise. The example embodiments presented in this disclosure are not meant to be limiting. Other embodiments may be utilized, and other changes may be made, without departing from the scope of the subject matter presented in this disclosure. Aspects of this disclosure can be arranged, substituted, combined, separated, and designed in a wide variety of different configurations.

Example Client-Server System

Figure 1:
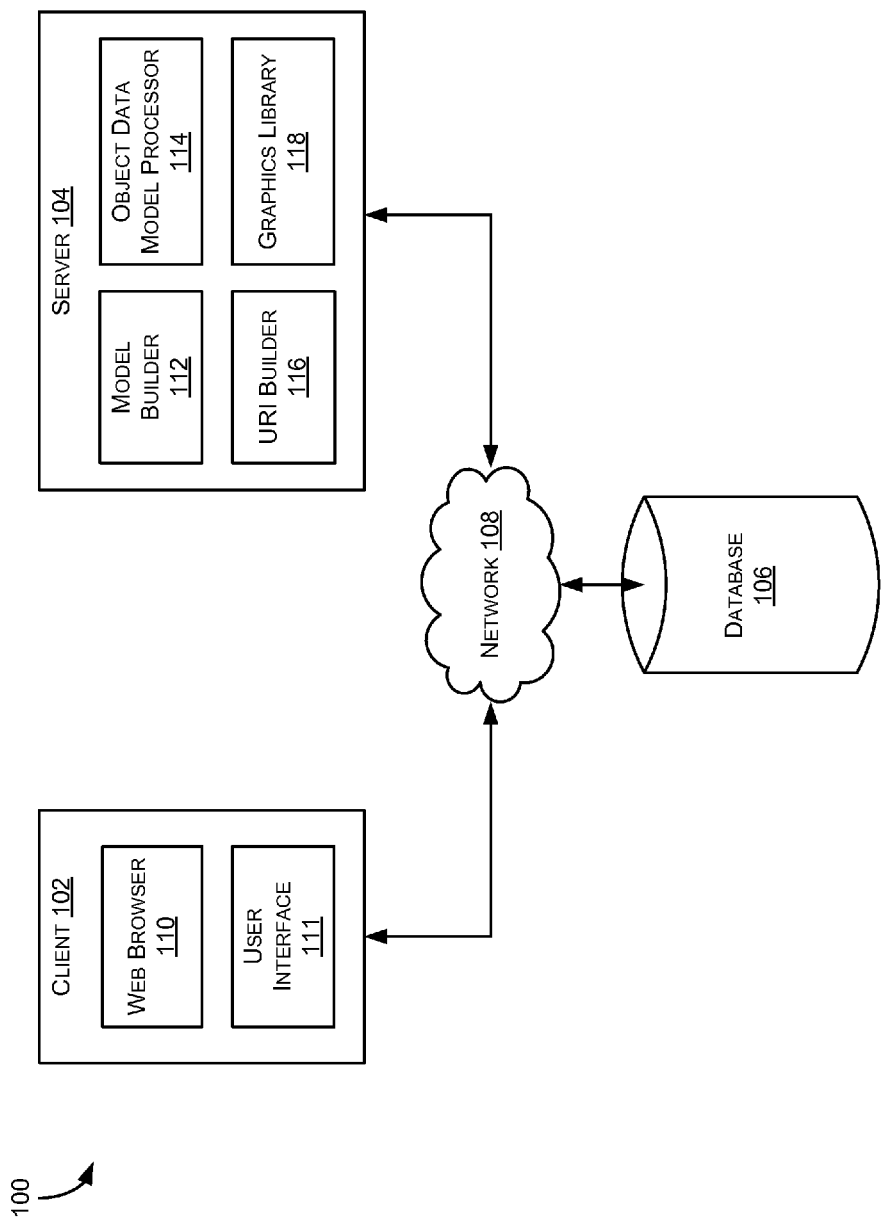
FIG. 1 illustrates an example of a client-server system.

FIG. 1 illustrates an example of a client-server system 100 in which disclosed systems and methods may be implemented. The client-server system 100 includes a client 102, a server 104, and a database 106 interconnected by a network 108. The client 102 includes one or more computing devices. Likewise, the server 104 includes one or more computing devices. The database 106 includes one or more databases.

The client 102 includes, among other things, a Web browser 110 and a user interface 111. The Web browser 110 may be any suitable Web browser that is able to present one or more Web pages. The user interface 111 may have one or more components, which may include hardware, software, or a combination of hardware and software. The user interface 111 may include input devices. Examples of input devices include keyboards, mice, presence-sensitive devices (for example, a touch screen device), sound-sensitive devices (for example, a voice-activated device), and motion-tracking devices (for example, an eye-tracking device). The user interface 111 may also include output devices. Examples of output devices include displays, projectors, and speakers. These examples of input and output devices are meant to be illustrative and not limiting; the user interface 111 may include any other type of input device or output device. Any input device or output device of the user interface 111 may be coupled to (or integrated with) any other device of the client 102.

Any component of the client 102 may be coupled to any other component of the client 102. In addition, any component of the client 102 may instead be a separate component coupled to the client 102. The client 102 may include a processor and memory including instructions executable by the processor to perform functions of the components of the client 102.

The server 104 includes a model builder 112, an object data model processor 114, a uniform resource identifier (URI) builder 116, and a graphics library 118. Any component of the server 104 may be coupled to any other component of the server 104. In addition, any component of the server 104 may instead be a separate component coupled to the server 104. The server 104 may include a processor and memory including instructions executable by the processor to perform functions of the components of the server 104.

The model builder 112 may receive a three-dimensional (3D) object data model from an input source (not shown). For example, a 3D object data model may be acquired in the form of scanned images from a vendor or manufacturer. As another example, structured light scanners may capture images of an object, and a shape of the object may be recovered using monochrome stereo cameras and a pattern projector. As yet another example, a high-resolution DSLR camera may be used to capture images for color texture information. As yet another example, a raw computer-aided drafting (CAD) set of drawings may be received for an object. Thus, the model builder 112 may receive a 3D object data model in various forms.

The model builder 112 may receive a 3D object data model, and may generate an animated 3D representation of an object, for example. As another example, the model builder 112 may perform coherent texture unwrapping from a mesh surface of the 3D object data model, and determine textures of surfaces emulated from the geometry.

The object data model processor 114 may also receive a 3D object data model for an object, and may generate display meshes. For example, scanned mesh images may be decimated (for example, from 5 million to 120,000 surfaces) utilizing texture-preserving decimation. The object data model processor 114 may also perform texture map generation to determine color texture for map rendering.

The URI builder 116 may generate a URI or the portion of the URI. The URI builder 116 may generate the URI or the portion of the URI according to Request for Comments (RFC) 3986, published by the Internet Engineering Task Force (IETF), which defines the syntax to be used for a URI. For example, the URI may be indicative of or include information for retrieving a 3D object data model, a view of a 3D object data model, or other information associated with a 3D object data model.

The graphics library 118 may include a WebGL or OpenGL mesh compression, for example, to reduce a mesh file size. The graphics library 118 may provide the 3D object data model in a form for display on a browser (for example, the web browser 110). As an example, the browser 110 may include an embedded viewer that can display images of 3D object data models. The embedded viewer of this example may be implemented using WebGL or OpenGL, for example.

With continued reference to FIG. 1, the database 106 may store all data sets for a 3D object data model in any number of various forms, from raw data captured to processed data for display. The database 106 may store other information, depending on the desired implementation.

As mentioned above, the client 102, the server 104, and the database 106 are interconnected by the network 108. The network 108 may include one or more suitable types of networks. Examples of suitable types of networks include a wide area network (WAN), a local area network (LAN), a wireless network (Wi-Fi), and the Internet. Communication links in the network 108 may include wired connections, such as a serial or parallel bus. Communication links in the network 108 may also, or instead, include wireless links, such as Bluetooth, any IEEE 802.11-based link, or another suitable wireless communication link.

The client-server system 100 may be used to provide views of a 3D object data model by way of a suitable Web page. An example of a suitable Web page follows.

Example Web Page

Figure 2A:
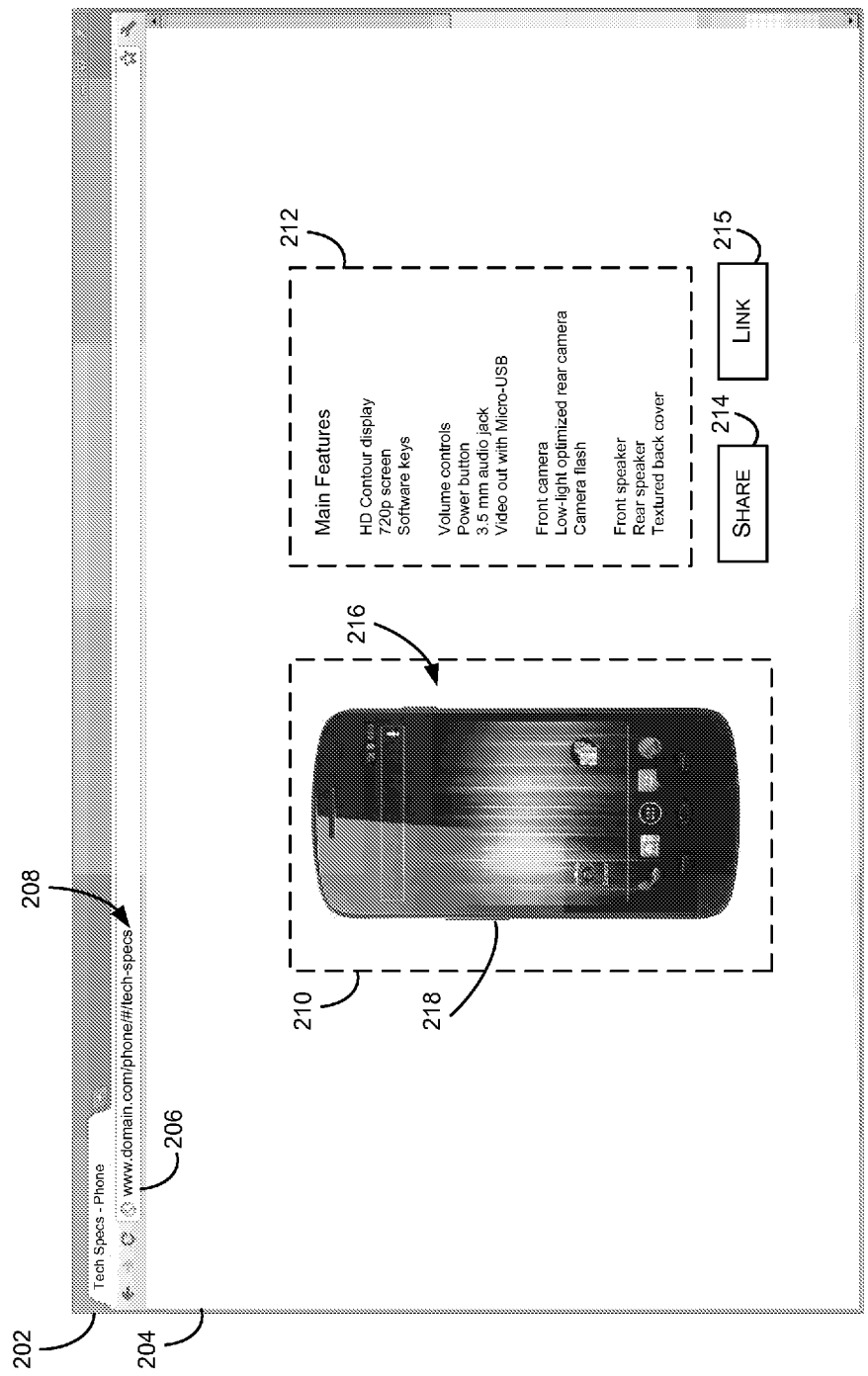
FIGS. 2A-2G illustrate examples of Web pages providing views of three-dimensional (3D) object data models.
Figure 2B:
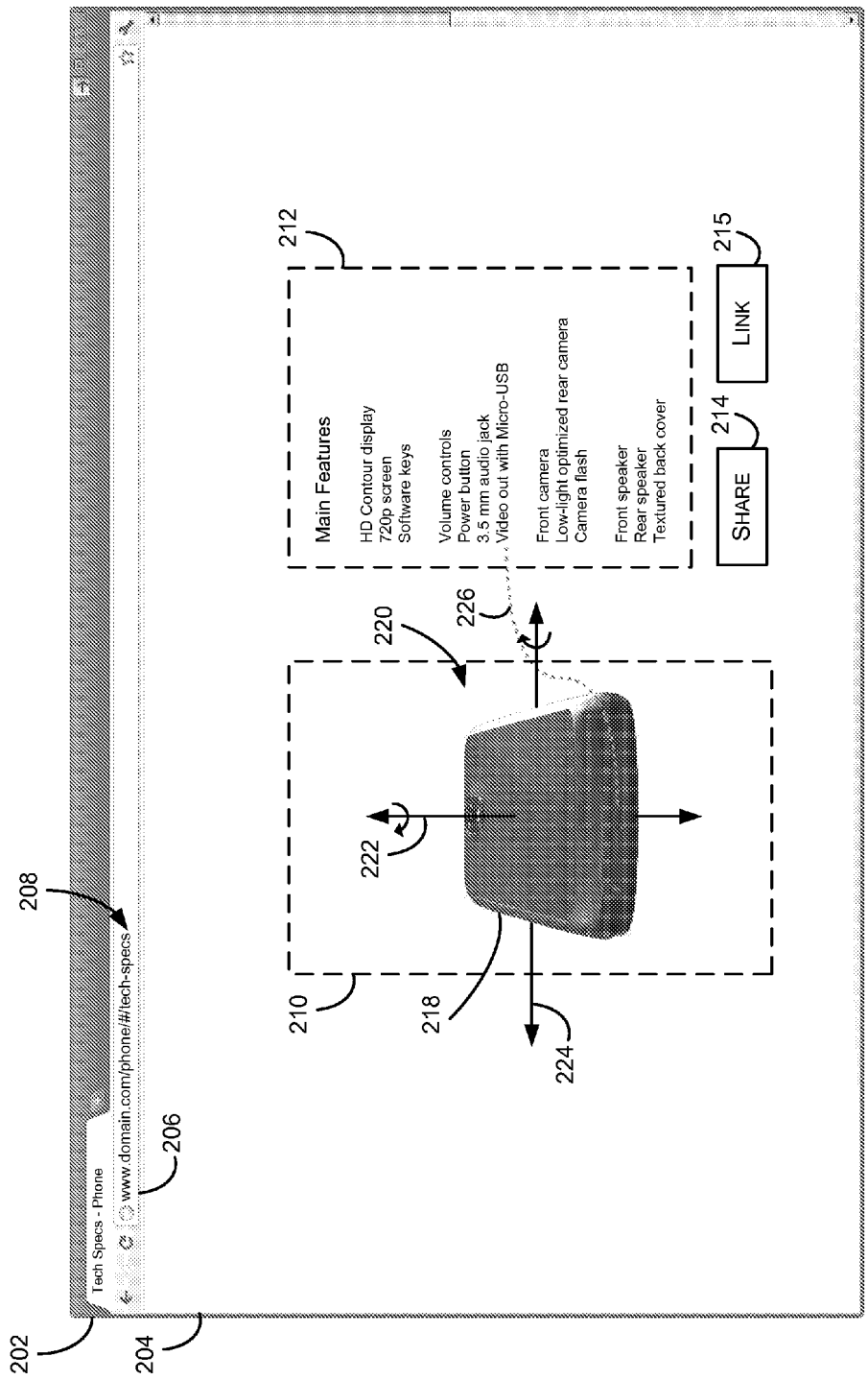
Figure 2C:
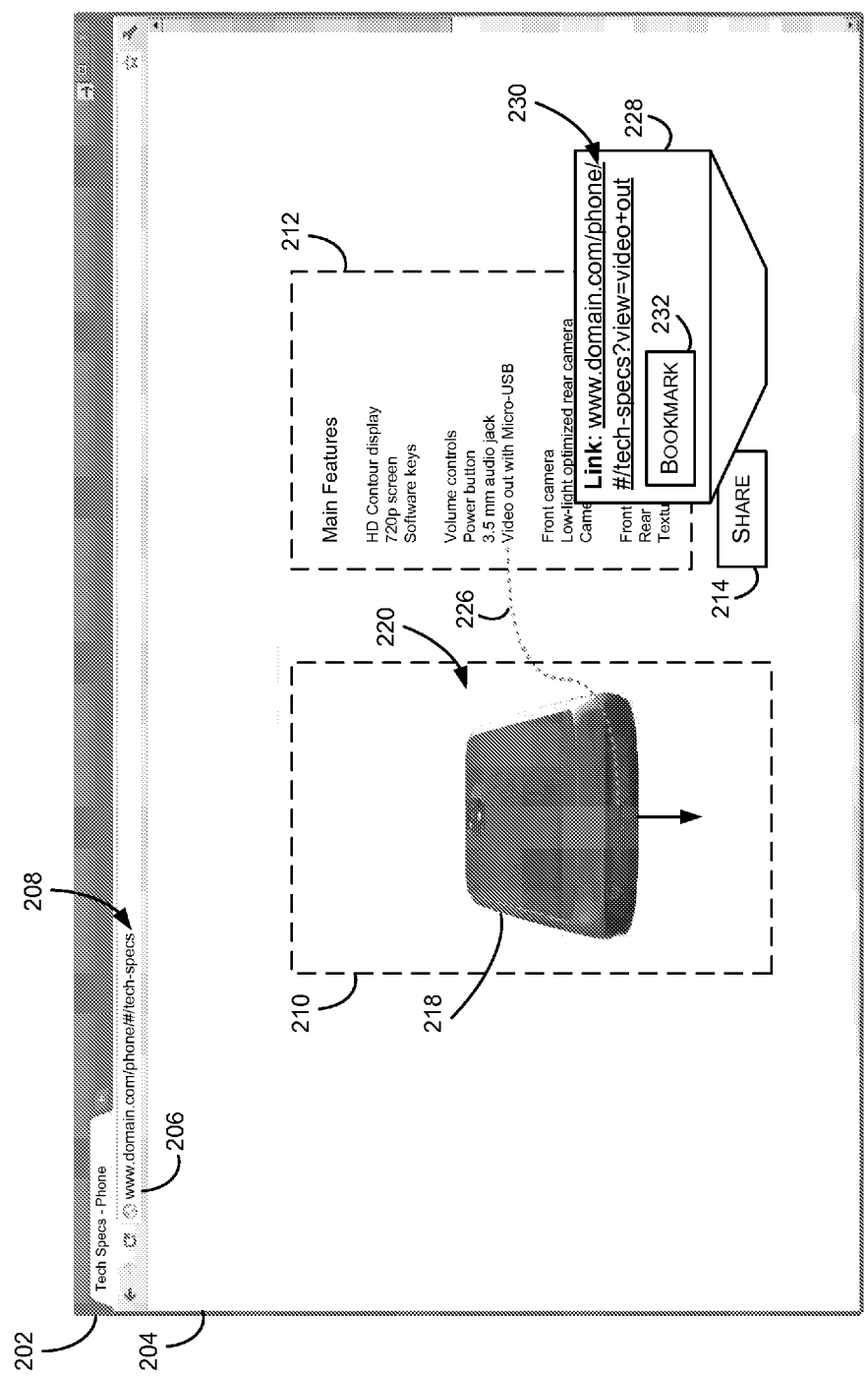

FIGS. 2A-2C illustrates an example of a Web page that may provide views of a three-dimensional (3D) object data model according to some examples of the disclosed methods and systems.

FIG. 2A illustrates a Web browser 202 that presents a Web page 204. The Web browser 202 may be the web browser 110 illustrated in FIG. 1. The Web browser 202 may be a standard Web browser. The Web browser 202 includes an address bar 206 that shows a URI 208 of the Web page 204 that the Web browser 202 presents. In particular, the URI 208 of the Web page 204 is "www.domain.com/phone/#/tech-specs". The Web browser 202 may include other features commonly implemented in Web browsers.

The Web page 204 includes, among other things, an embedded viewer 210 (indicated by dashed lines), a feature listing 212 (indicated by dashed lines), a share button 214, and a link button 215.

The embedded viewer 210 may be a 3D object viewer. Accordingly, the embedded viewer 210 may present various 3D views of one or more objects. The one or more objects may be a single object. Instead, the one or more objects may, for example, include multiple spaced apparatuses. In addition, the one or more objects may include a portable object. For example, the embedded viewer 210 presents a first 3D view 216 showing a mobile device 218 from a frontal perspective. The embedded viewer 210 may, for example, receive 3D object data models and display views of the models.

The feature listing 212 lists several examples of features of the mobile device 218 presented by the embedded viewer 210. The examples of features are merely illustrative; these examples are not meant to limit the disclosed methods or systems. The first 3D view 216 of the mobile device 218 presents some of the listed features, such as, for example, "720P screen" and "Software Keys"; however, the first 3D view 216 does not present or illustrate other listed features, such as "Volume Controls", "Rear Speaker", and "Camera Flash".

The embedded viewer 210 or any other portion of the Web page 204 may receive input to change the first 3D view 216 of the mobile device 218 to another 3D view of the mobile device 218. The input may be received by way of the user interface 111 illustrated in FIG. 1. For example, the embedded viewer 210 may change the first 3D view 216 to another view in response to a movement of a mouse cursor across a portion of the embedded viewer 210. As another example, in a presence sensitive device, the embedded viewer 210 may change the first 3D view 216 to another view in response to a movement of a finger or capacitive device across a portion of the presence sensitive device that corresponds to the embedded viewer 210. As yet another example, in a sound-sensitive device, the embedded viewer 210 may change the first 3D view 216 to another view in response to certain voice commands, such as "Show the back of the phone" or "Flip the phone over". As yet another example, a selection of some of the features in the feature listing 212 may change the first 3D view 216 to another view.

FIG. 2B illustrates the Web page 204 after the embedded viewer 210 or other portion of the Web page 204 receives input sufficient to change the first 3D view 216 (illustrated in FIG. 2A) to a second 3D view 220 of the mobile device 218. A first axis 222 and a second axis 224 are provided in FIG. 2B to illustrate how the embedded viewer 210 rotates the mobile device 218 from the first 3D view 216 (illustrated in FIG. 2A) to the second 3D view 220. The first axis 222 is orthogonal to the second axis 224. In particular, the embedded viewer 210 rotates the mobile device 218 by 180° about the first axis 222 and by 90° about the second axis 224 in the respective directions indicated on the first axis 222 and the second axis 224. In general, the embedded viewer 210 may rotate one or more presented objects (for example, the mobile device 218) by any angular value about one or more axes in an arbitrary set of three orthogonal axes. In some examples, the embedded viewer 210 enables one or more objects to be rotated by more than 180° about any of three orthogonal axes.

The disclosure above provides for changing the first view 216 of the mobile device 218 to the second view 220 of the mobile device 218 by way of a rotation. A rotation is but one type of 3D view change, and this disclosure contemplates various other 3D view changes, alone or in combination. For example, the embedded viewer 210 may receive input to shift the mobile device 218 in one or more linear directions (for example, along axis 222, axis 224, or both). As another example, the embedded viewer 210 may receive input to change various other presentation-related features, including a size of the mobile device 218, an orientation of the mobile device 218, a perspective of the mobile device 218, a color of the mobile device 218, a background color to the mobile device 218, a background image to the mobile device 218, a lighting condition of the mobile device 218, and combinations of these. As yet another example, the embedded viewer 210 may receive input to add one or more annotations not already present in the feature listing 212. As yet another example, the embedded viewer 210 may receive input to change the first view 216 (illustrated in FIG. 1A) to an exploded view that presents various components of the mobile device 218 in a spaced manner. In this example, the embedded viewer 210 may receive further input to add one or more annotations to the exploded view. These examples are meant to be illustrative and not limiting; this disclosure contemplates various other ways to change a 3D view of one or more objects presented by an embedded viewer in a Web page.

In addition, in some examples, a given 3D view of one or more presented objects may present several orientations of the one or more presented objects. In other words, the 3D view may be an animation. For example, the second 3D view 220 may present an animation of the mobile device 218 being rotated from the orientation shown in FIG. 2A to the orientation shown in FIG. 2B.

The Web page 204 may present annotations corresponding to one or more objects presented by the embedded viewer 210. For example, in FIG. 2B, the second 3D view 220 primarily presents a bottom portion of the mobile device 218 and, in particular, focuses on the "Video out with Micro-USB" feature of the mobile device 218. Accordingly, the Web page 204 presents an annotation 226 to identify the "Video out with Micro-USB" feature.

The Web page 204 may provide for sharing a view of one or more objects presented by the embedded viewer 210. For example, in the Web page 204 illustrated in FIG. 2B, the share button 214 and the link button 215 provide for sharing the second 3D view 220 of the mobile device 218. The share button 214 and the link button 215 provide convenient ways for a user to share a desirable view of the mobile device 218 with another user. As an example, selecting the share button 214 may post a link (for example, a URI) of the Web page 204 presenting the second 3D view 220 to a social network. Accordingly, a viewer of the link posted to the social network can select the link to access the Web page 204 presenting the second 3D view 220 of the mobile device 218 (or to access a different Web page presenting the second 3D view). As another example, selecting the share button 214 may provide an interface for sending an e-mail that includes a link of the Web page 204 presenting the second 3D view 220 (or of a different Web page presenting the second 3D view). These examples are not meant to limit the disclosed methods and systems; this disclosure contemplates various other ways to share a 3D view of one or more objects presented by an embedded viewer of a Web page.

Selecting the link button 215 may present a link, such as a URI, that provides access to the Web page 204 presenting the second 3D view 220 of the mobile device 218. FIG. 2C illustrates the Web page 204 upon selection of the link button

215. As illustrated in FIG. 2C, selecting the link button 215 causes the Web page 204 to present a window portion 228, which shows a URI 230 of the Web page 204 presenting the second 3D view 220 of the mobile device 218. Notably, the URI 230 is different from the URI 208 displayed in the address bar 206 of the Web browser 202. Thus, the URI 208 provides access to a version of the Web page 204 presenting a default 3D view (for example, the first 3D view 216) of the mobile device 218, whereas the URI 230 provides access to a version of the Web page 204 presenting a custom 3D view (for example, the second 3D view 220) of the mobile device 218.

The window portion 228 may also present a bookmark button 232 that provides for storing the URI 230, for example, to the client 102 or the server 104 (illustrated in FIG. 1).

A given URI, such as the URI 230, may be indicative of view information that corresponds to one or more features of the second 3D view 220 of the mobile device 218. The URI 230 may, for example, include view information corresponding to a size of the mobile device 218, an orientation of the mobile device 218, a perspective of the mobile device 218, a color of the mobile device 218, a background color to the mobile device 218, a background image to the mobile device 218, a lighting condition of the mobile device 218, and combinations of these features and others. In addition, a given URI, such as the URI 230, may include one or more human-readable descriptors identifying features of one or more presented objects (for example, the mobile device 218). For example, the URI 230 includes an authority part ("www.domain.com"), a path part ("/phone/#/tech-specs"), a query identifier ("?"), and a query ("view=video+out"). Generally, the query may provide a key/value pair that indicates how the embedded viewer is to present a given 3D view. Thus, the query "view=video+out" indicates that the embedded viewer 210 is to present a 3D view (for example, the second 3D view 220) that includes the "Video out with Micro-USB" feature. As another example, the URI 230 may instead include the query "z=180:x=90". In this example, the element "z" corresponds to the first axis 222, the element "x" corresponds to the second axis 224, and the values "180" and "90" represent magnitudes of angular rotation about the respective axes. Notably, in this example, because the query "z=180:x=90" does not specify a magnitude of angular rotation about a third axis (for example, a y-axis), the embedded viewer 210 could present the mobile device 218 at a default angular orientation with respect to the third axis.

In this context, a query in a URI may also, or instead, indicate how the embedded viewer 210 is to render one or more features of a given 3D view. For example, the URI 230 may include, in addition to the query "view=video+out", another query "rend=video+out". The query "rend=video+out" may indicate that the embedded viewer 210 is to render the "Video out with Micro-USB" feature prior to rendering other features of the mobile device 218. In this way, the embedded viewer 210 can render a feature that may be of interest to a user relatively quickly.

Although the disclosure above indicates that the URI 230 includes the query "view=video+out", this disclosure contemplates various other ways by which the URI 230 may include view information. For example, the URI 230 may also, or instead, include a fragment that follows a hash symbol. In this example, the fragment may be an ID attribute of a specific element. The fragment may indicate how the embedded viewer 210 is to render and/or present one or more features of the mobile device 218, a given view of the mobile device 218, or both. These examples are meant to be illustrative and not limiting; this disclosure contemplates various other ways by which a URI may include view information.

However, the URI 230 itself need not include human readable view information or any view information at all, and may be indicative of view information in various other ways. For example, the URI 230 may not include human-readable view information and may instead include view information in the form of a unique string of information that corresponds to information stored elsewhere (for example, to the server 104 or the database 106 illustrated in FIG. 1). As another example, the URI 230 may include no view information and may instead reference another URI that includes view information. In this example, the URI 230 may be a shortened URI that is generated by a URI shortener service, and the shortened URI may correspond to another URI that includes view information. These examples are meant to be illustrative and not limiting; this disclosure contemplates various other ways by which a URI may be indicative of view information.

With reference to FIGS. 2B and 2C, there are various other ways to display the URI 230 of the Web page 204 presenting the second 3D view 220 of the mobile device 218. For example, selecting the link button 215 may generate another Web page in a different tab of the Web browser 202 or in a different Web browser altogether, and the URI of the other Web page may appear in an address bar or the like. As another example, selecting the link button 215 may cause the Web browser 202 to replace the URI 208 (or a relevant portion of the URI 208) in the address bar 206 with all or part of the URI 230.

In addition, the Web page 204 may communicate with the Web browser 202 to update the URI 208 without a need to select the link button 215 or any other button. For example, the Web page 204 may communicate with the Web browser 202 to replace part or all of the URI 208 with a relevant portion of the URI 230 in response to the embedded viewer 210 changing the first 3D view 216 (illustrated in FIG. 2A) of the mobile device 218 to the second 3D view 220 (illustrated in FIGS. 2B and 2C).

Figure 2D:
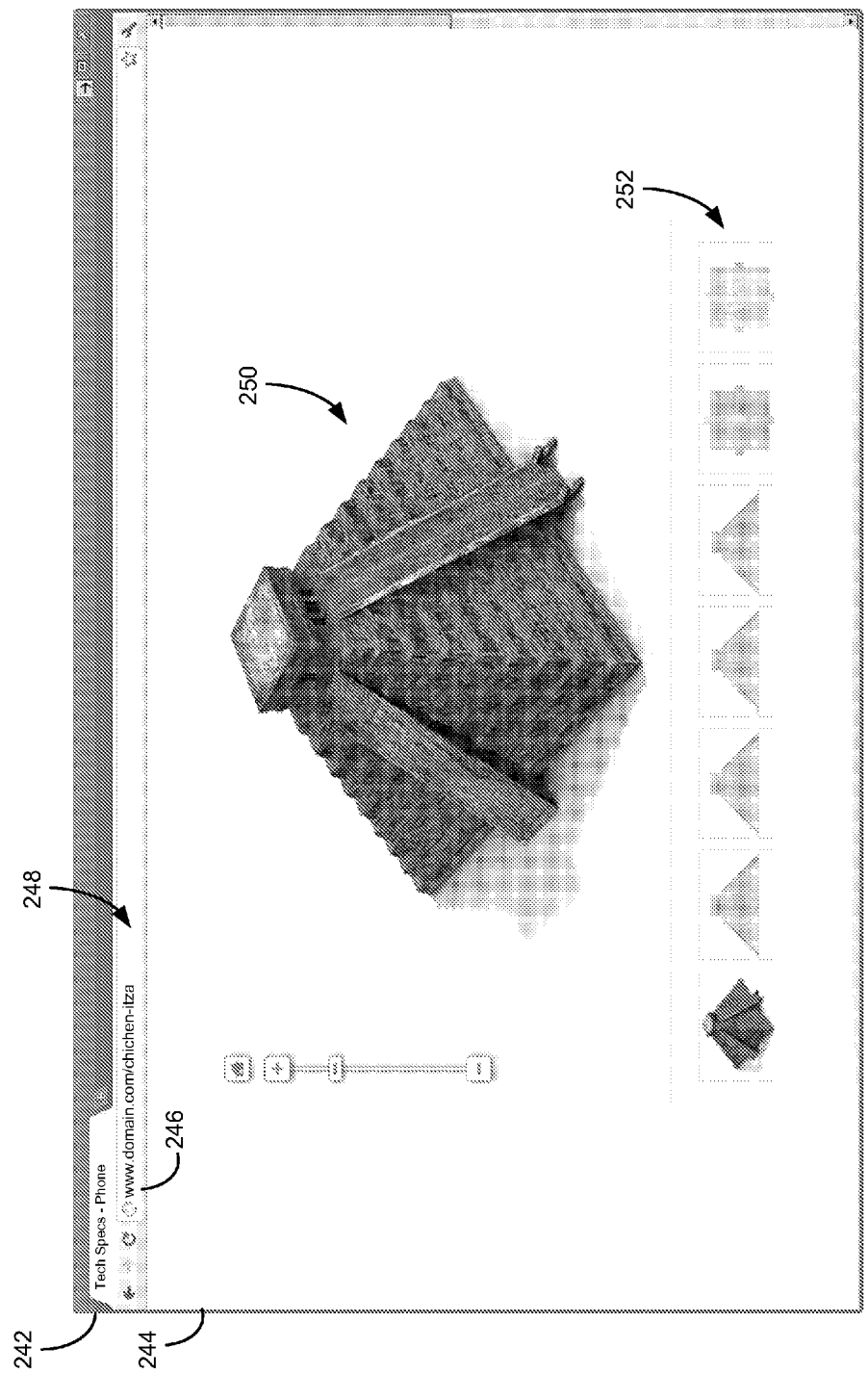

FIGS. 2A-2C show a 3D object data model with reference to a text-based feature listing. In some implementations, a 3D object data model may be provided with reference to a graphical panel of views. For example, FIG. 2D illustrates an example of a Web page that may provide views of a 3D object data model. In particular, FIG. 2D illustrates a Web browser 242 that presents a Web page 244. The Web browser 242 includes an address bar 246 that shows a URI 248 of the Web page 244. The Web page 244 may present a 3D view 250 of a building. In addition, the Web page 244 includes a graphical panel 252 that shows several other 3D views of the building. In some implementations, the views in the graphical panel 252 may be default views. In some implementations, the views in the graphical panel 252 may be custom views. For example, a user may have generated the views in the graphical panel 252 during a previous visit to the Web page 244, and the views may be generated upon the user's subsequent visit to the Web page 244.

Figure 2E:
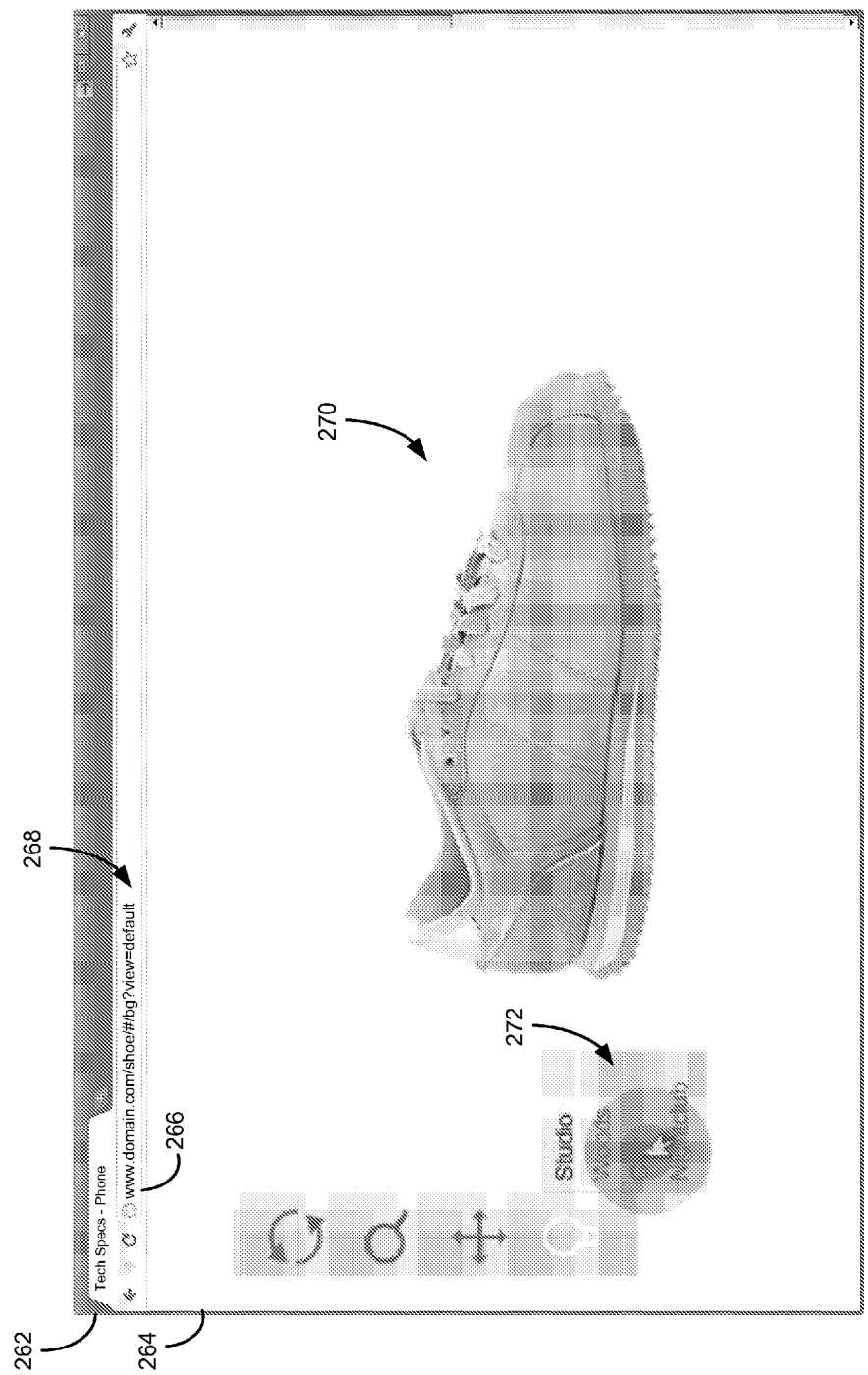
Figure 2F:
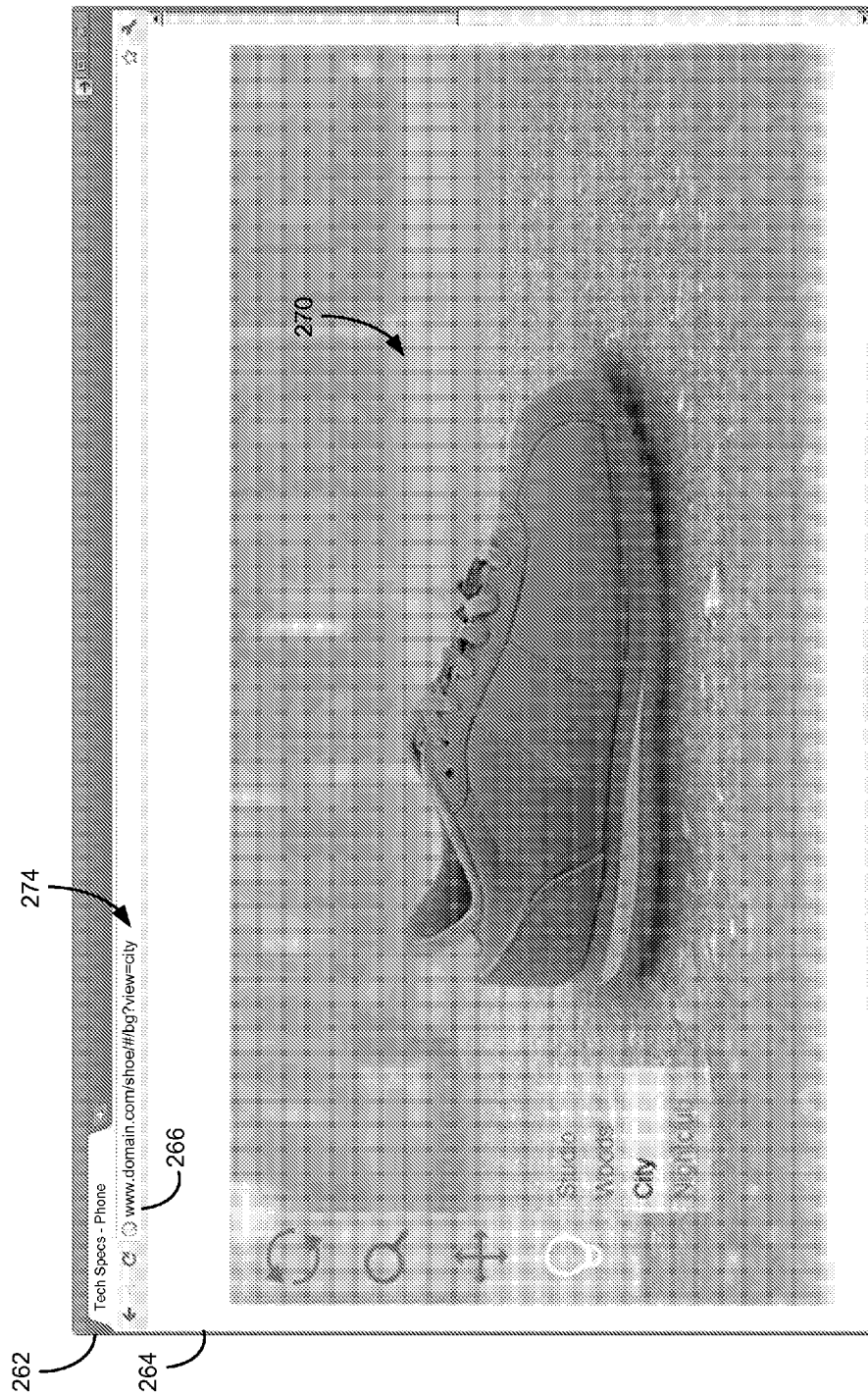

As mentioned above, view information can correspond to a variety of features. Depending on the relevant context, some of the features may be referred to herein as "rendered features." FIGS. 2E-2F show an example of view information that corresponds to a background image. In particular, FIG. 2E illustrates a Web browser 262 that may present a Web page 264. The Web browser 262 includes an address bar 266 that shows a URI 268 of the Web page 264. The Web page 264 presents a 3D view 270 of a shoe. In addition, the Web page 264 includes a panel 272 that includes several links. A user can change a background images to the shoe by selecting one of the links in the panel 272. FIG. 2F shows the Web page 264 upon selection of the "City" link. As shown in FIG. 2F, the Web page 264 shows the shoe in a city setting. Note that the URI 274 of the Web page 264 in FIG. 2F is different from the URI 268 of the Web page in FIG. 2E. Accordingly, if a user wants to share the view of the shoe in the city setting, then the user can use the URI 274 to do so. For example, the user can send an e-mail that includes the URI 274, can share the URI 274 in a social network, or the like.

Figure 2G:
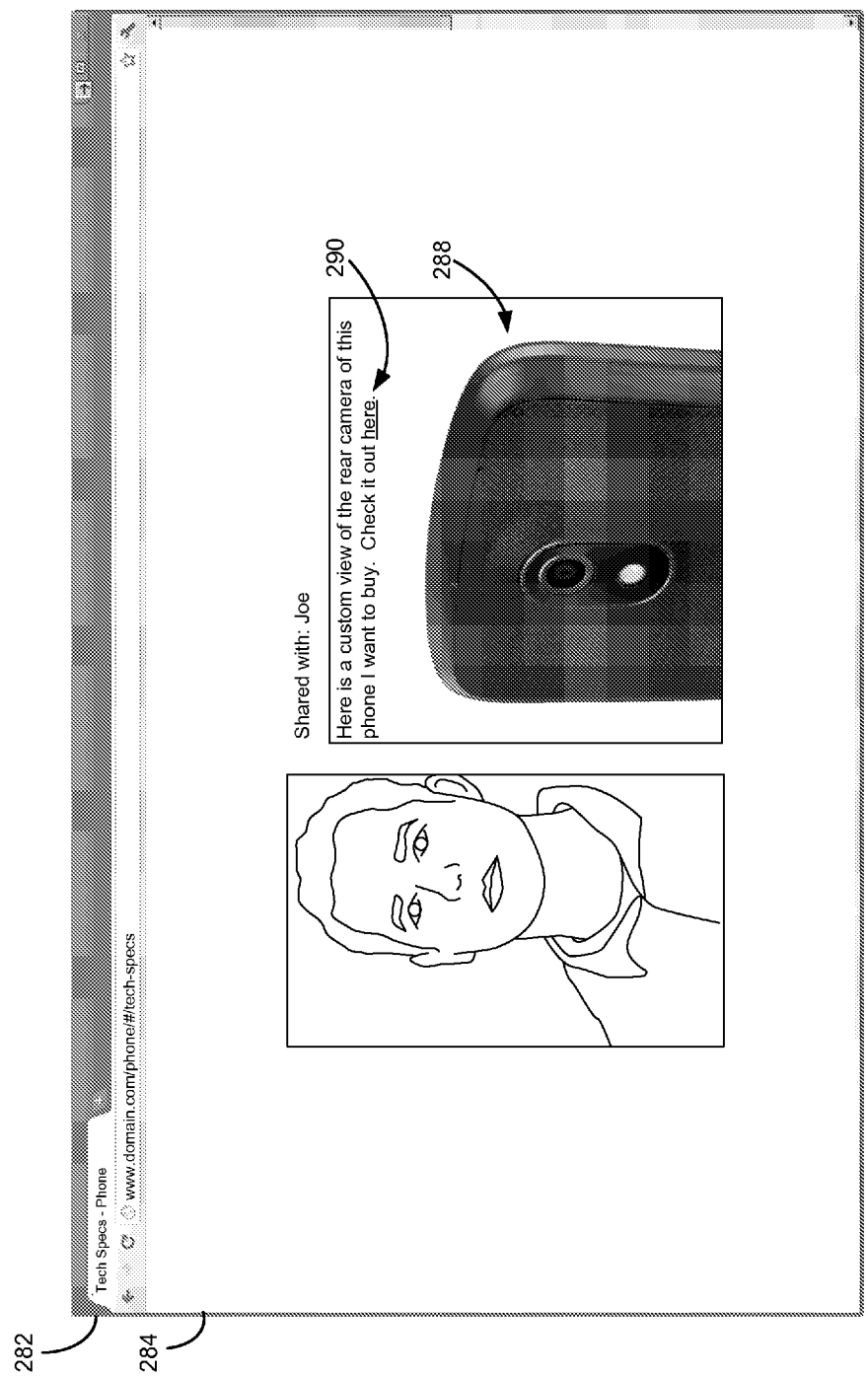

FIG. 2G shows an example of a Web page that may present a shared 3D view. In particular, a Web browser 282 presents a Web page 284. The Web page 284 may be, for example, a Web page of a social network. As shown in FIG. 2G, the Web page 284 includes a shared 3D view 288 of a phone. The shared 3D view 288 shows a rear perspective of the phone. In addition, the Web page 284 includes a link 290. The link 290 may provide access to a separate Web page 284, a pop-up window to the Web page 284, or the like, that presents the shared 3D view of the object. Although the Web page 284 shows the shared 3D view 288, in some implementations, a Web page may show a default 3D view of an object (for example, a 3D view of the front of the phone), and the Web page may include, for example, a link that provides a user with access to the shared 3D view of the object. In some implementations, a Web page may not show a shared 3D view of an object but may include, for example, a link that provides a user with access to the shared 3D view of the object.

Example Method

Figure 3:
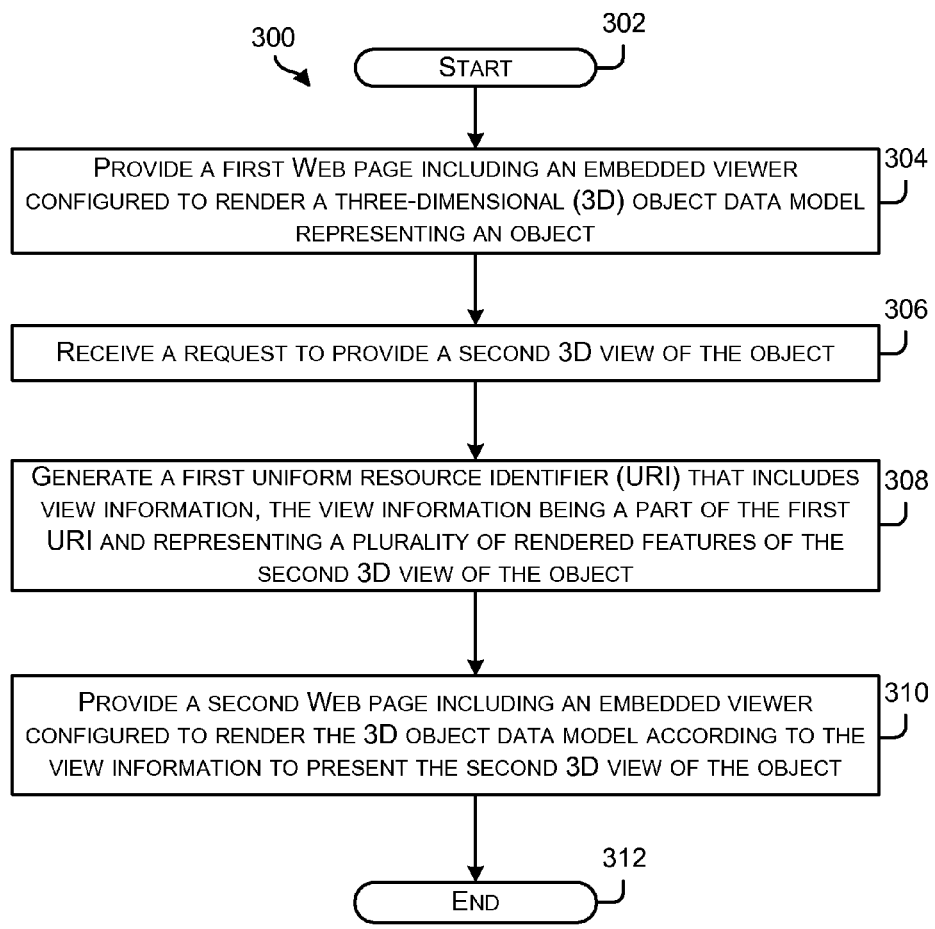
FIG. 3 is a block diagram that illustrates an example of a method for providing views of 3D object data models.

FIG. 3 is a block diagram that illustrates an example method 300 for providing views of 3D object data models. The method 300 presents an embodiment that may be used, for example, with the client-server system 100 and Web page 204, and that may be performed, for example, by any component illustrated in FIGS. 1 and 2A-2C. The method 300 may include one or more operations, functions, or actions, as illustrated by blocks 302-312. Although FIG. 3 shows the blocks 302-312 in a sequential order, these blocks may be performed in parallel or in a different order. Also, the blocks 302-312 may be combined into fewer blocks, divided into additional blocks, or removed, depending on the desired implementation.

In addition, each of the blocks 302-312 may represent a module, a segment, or a portion of program code, which includes one or more instructions executable by a processor or computing device for implementing specific logical functions or steps in the method 300. The program code may be stored on any type of computer-readable medium or memory (for example, a storage device including a disk or hard drive). The computer-readable medium may include a non-transitory computer readable medium, such as a computer-readable medium that stores data for short periods of time, like register memory, processor cache, and random access memory (RAM). The computer-readable medium may also include non-transitory media, such as secondary or persistent long term storage, like read only memory (ROM), optical or magnetic disks, and compact-disc read only memory (CD-ROM). The computer-readable media may be any other volatile or non-volatile storage system. The computer-readable medium may be considered a computer-readable storage medium or a tangible storage device.

In addition, each of the blocks 302-312 may represent circuitry that is wired to perform the specific logical functions in the method 300.

Block 304 of the method 300 includes providing a first Web page including an embedded viewer configured to render a 3D object data model representing an object to present a first 3D view of the object. The embedded viewer may be operable to receive input to change the first 3D view of the object to a second 3D view of the object. For example, with reference to FIGS. 1 and 2A, the server 104 may provide the Web page 204 to the client 102 such that the embedded viewer 210 presents the first 3D view 216 of the mobile device 218.

Block 306 of the method 300 includes receiving a request to provide the second 3D view of the object. For example, with reference to FIGS. 1 and 2B, the Web page 204 may receive a selection of the share button 214 or the link button 215. In response to receiving the selection, the Web page 204 may send a request to the server 104.

Block 308 of the method 300 includes generating a first URI. The first URI includes view information. The view information is a part of the first URI and represents a plurality of rendered features of the second 3D view of the object. For example, with reference to FIGS. 1 and 2C, the URI builder 116 of the server 104 may generate the URI 230 (or a portion of the URI 230). As mentioned above, the URI includes a query "view=video+out" that indicates that the second view 220 of the mobile device 218 presents the "Video out with Micro-USB" feature. In some examples, generating the first URI includes generating a unique string of information based on the plurality of features. For example, the URI builder 116 may generate a hash value based on several features of one or more presented objects, and include the hash value in a given URI or use the hash value in association with the URI.

Block 310 of the method 300 includes providing a second Web page including an embedded viewer configured to render the 3D object data model according to the view information to present the second 3D view of the object. For example, with reference to FIGS. 1 and 2C, submitting the URI 230 by way of the address bar 206 of the Web browser 202 may cause the server 104 to generate a version of the Web page 204 that illustrates the second 3D view 220 of the mobile device 218. As another example, submitting the URI 230 in this way may cause the server 104 to generate a different Web page that includes an embedded viewer that presents the mobile device 218 according to the second view 220. In this example, the different Web page may include information not present in the Web page 204. For instance, the different Web page may present the message "Hello Alice: Bob shared this view with you".

In some examples, the second 3D view of the object presents a first feature of the object. In these examples, the method includes determining that the first feature is a target feature of the object. Further, the embedded viewer of the second Web page may be configured to prioritize a rendering of the target feature. For instance, with reference to FIG. 2B, the embedded viewer 210 may prioritize a rendering of the "Video out with Micro-USB" feature of the mobile device 218. In addition, in some examples, the view information may include an identifier that corresponds to the target feature of the object. For example, with reference to FIG. 2C, the URI 230 may include an additional query "rend=video+out" to indicate that the embedded viewer 210 is to render the "Video out with Micro-USB" prior to rendering other features of the mobile device 218.

In some examples, the method 300 may include identifying, based on one or more uniform resource identifiers, a popular feature of the object that is represented by the one or more uniform resource identifiers. A popular feature of a given object may be a feature that is presented in a predetermined number (or proportion) of Web pages illustrating one or more 3D views of the object. For example, the server 104 may search one or more Web sites to identify a URI, such as the URI 230, of a Web page that presents a given object. The server 104 may then process the identified URIs to identify a popular feature of the given object. In this example, the server 104 may identify the popular feature, for example, by parsing the identified URIs, performing image recognition in the Web pages corresponding to the identified URIs, and examining a quantity of page visits (or "page hits") to the identified URIs. In addition, the server 104 may provide a Web page with an embedded viewer that presents a 3D view that shows the popular feature of the given object. As another example, the server 104 may process the identified URIs to identify a popular 3D view of the given object based on several popular features. In this example, the server 104 may, for example, identify the popular 3D view by identifying several popular features of the given object (by a technique disclosed above or another technique) and selecting a view that presents the identified popular features.

In some examples, the server 104 may provide a Web page such that the embedded viewer of the Web page presents a 3D view showing one or more popular features of a given object as an initial 3D view. Accordingly, in these examples, when the Web page loads, the embedded viewer may present the initial 3D view of the given object. These examples are meant to be illustrative and not limiting; this disclosure contemplates various other ways by which one or more popular features or views may be determined and/or presented.

Example Computing Device

Figure 4:
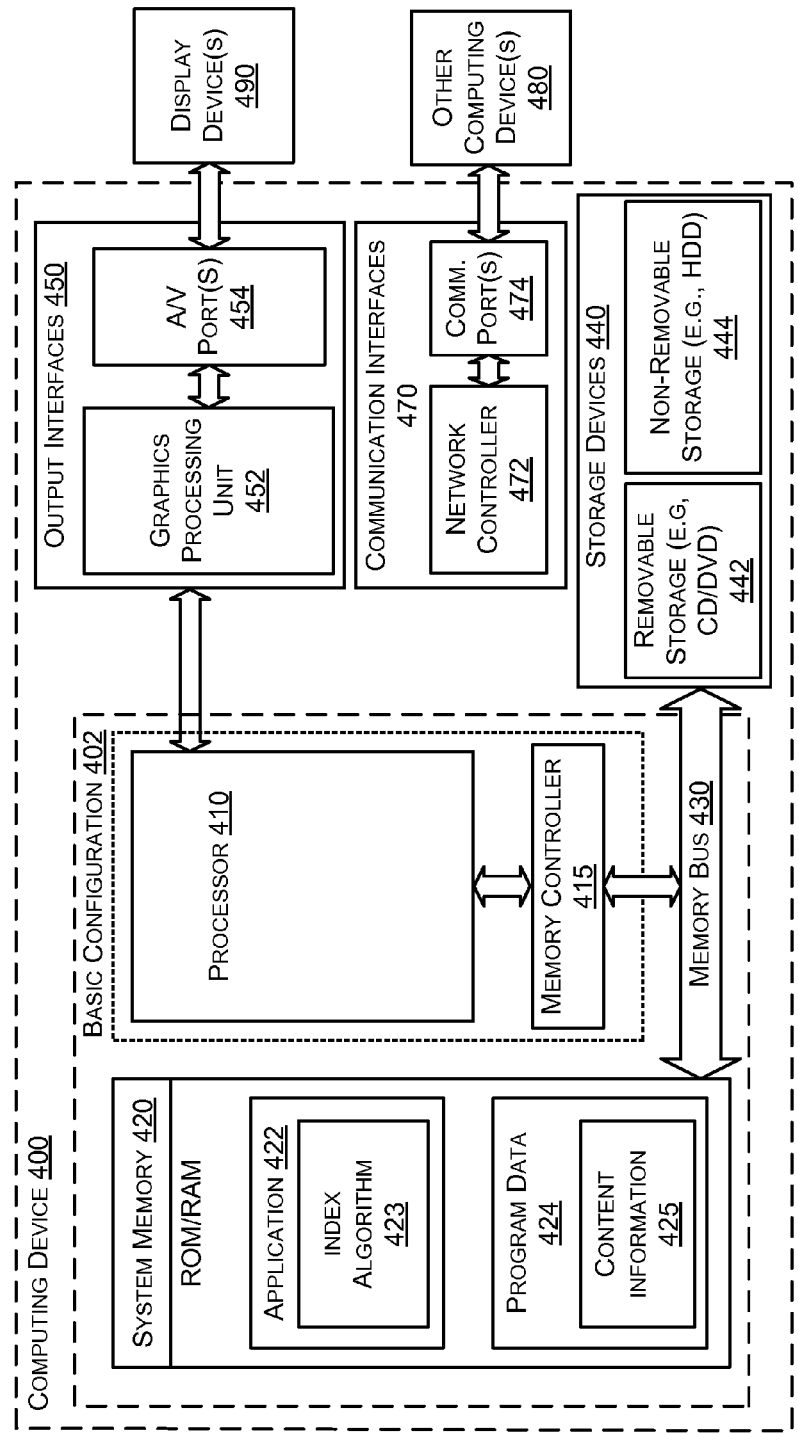
FIG. 4 is a block diagram that illustrates an example of a computing device.

FIG. 4 is a block diagram illustrating an example of a computing device 400 used in a computing system that is arranged in accordance with some disclosed embodiments. The computing device 400 may be a personal computer, mobile device, cellular phone, touch-sensitive wristwatch, tablet computer, video game system, or global positioning system, and may be implemented to provide a system for interacting with 3D data object models as described in FIGS. 1-3. In a basic configuration 402, the computing device 400 may include one or more processors 410 and system memory 420. A memory bus 430 can be used for communicating between the processor 410 and the system memory 420. Depending on the desired configuration, the processor 410 can be of any type, including a microprocessor (μP), a microcontroller (μC), a digital signal processor (DSP), or combinations of these. A memory controller 415 may also be used with the processor 410, or in some implementations, the memory controller 415 may be an internal part of the processor 410.

Depending on the desired configuration, the system memory 420 may be of any type, including volatile memory (such as RAM), non-volatile memory (such as ROM, flash memory), and any combination of these. The system memory 420 may include one or more applications 422 and program data 424. The application 422 may include an index algorithm 423 that is arranged to provide inputs to the electronic circuits, in accordance with this disclosure. The program data 424 may include content information 425 that may be directed to any number of types of data. In some embodiments, the application 422 may be arranged to operate with the program data 424 on an operating system.

The computing device 400 may have additional features or functionality, and additional interfaces to facilitate communication between the basic configuration 402 and any devices and interfaces. For example, data storage devices 440 may be provided including removable storage devices 442, non-removable storage devices 444, or a combination of these. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives. Computer storage media may include volatile and nonvolatile, non-transitory, removable and non-removable media implemented in any method or technology for storage of information, such as computer readable instructions, data structures, program modules, or other data.

The system memory 420 and the storage devices 440 are examples of computer storage media. Computer storage media includes, but is not limited to, RAM, ROM, EEPROM, flash memory or other memory technology, CD-ROM, DVDs or other optical storage, magnetic cassettes, magnetic tape, magnetic disk storage or other magnetic storage devices, or any other medium that can be used to store the desired information and that can be accessed by the computing device 400.

The computing device 400 may also include output interfaces 450 that may include a graphics processing unit 452, which may be configured to communicate with various external devices, such as display devices 490 or speakers by way of one or more A/V ports or a communication interface 470. The communication interface 470 may include a network controller 472, which may be arranged to facilitate communication with one or more other computing devices 480 over a network communication by way of one or more communication ports 474. The communication connection is one example of a communication media. Communication media may be embodied by computer-readable instructions, data structures, program modules, or other data in a modulated data signal, such as a carrier wave or other transport mechanism, and includes any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

The computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 may also be implemented as a personal computer including both laptop computer and non-laptop computer configurations.

Figure 5:
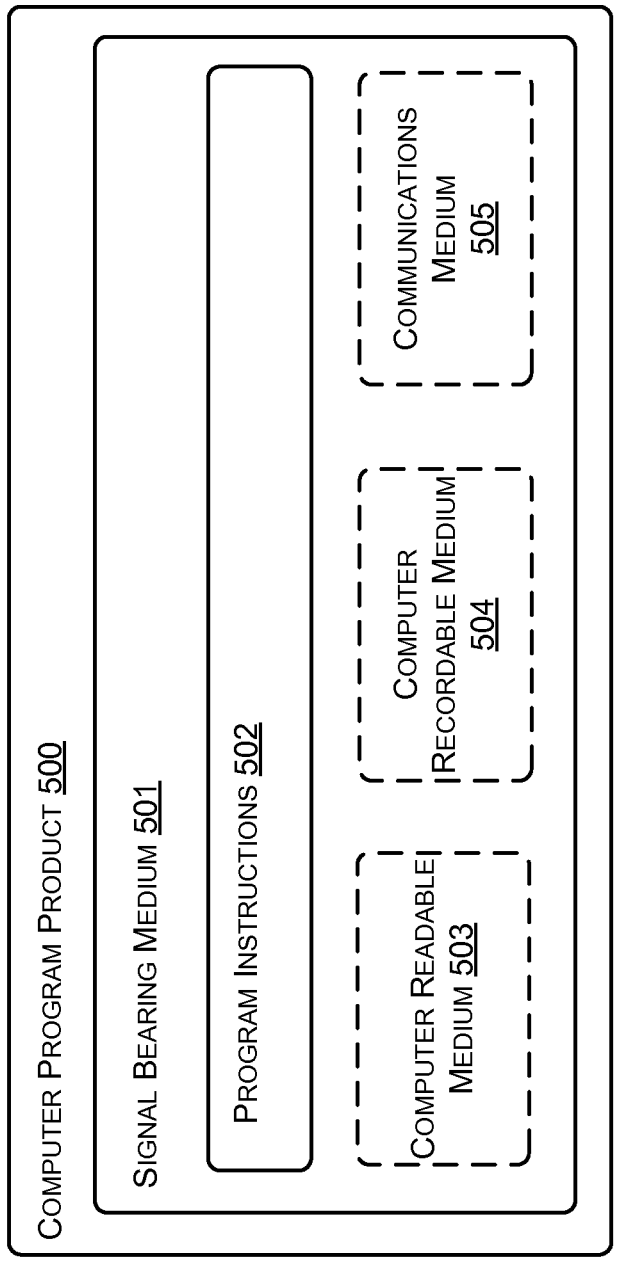
FIG. 5 illustrates a conceptual partial view of an example computer program

In some embodiments, the disclosed methods may be implemented as computer program instructions encoded on a non-transitory computer-readable storage medium in a machine-readable format, or on other non-transitory media or articles of manufacture. FIG. 5 illustrates a conceptual partial view of an example computer program product 500 that includes a computer program for executing a computer process on a computing device, arranged according to some disclosed embodiments.

In an embodiment, the computer program product 500 is provided using a signal bearing medium 501. The signal bearing medium 501 may include one or more programming instructions 502 that, when executed by one or more processors, may provide functionality or portions of the functionality described above with respect to FIGS. 1-3. In some examples, the signal bearing medium 501 may encompass a computer-readable medium 503, such as, but not limited to, a hard disk drive, a CD, a DVD, a digital tape, or memory. In some implementations, the signal bearing medium 501 may encompass a computer recordable medium 504, such as, but not limited to, memory, read/write (R/W) CDs, or R/W DVDs. In some implementations, the signal bearing medium 501 may encompass a communications medium 505, such as, but not limited to, a digital or analog communication medium (for example, a fiber optic cable, a waveguide, a wired communications link, or a wireless communication link). Thus, for example, the signal bearing medium 501 may be conveyed by a wireless form of the communications medium 505 (for example, a wireless communications medium conforming with the IEEE 802.11 standard or other transmission protocol).

The one or more programming instructions 502 may be, for example, computer executable or logic implemented instructions. In some examples, a computing device (such as the computing device 400 of FIG. 4) may be configured to provide various operations, functions, or actions in response to the programming instructions 502 conveyed to the computing device 500 by one or more of the computer-readable medium 503, the computer recordable medium 504, and the communications medium 505.

Arrangements provided in this disclosure are for purposes of example only. Those skilled in the art will appreciate that other arrangements and other elements (for example, machines, interfaces, functions, orders, and groupings of functions) may be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed, other aspects and embodiments will be apparent to those skilled in the art. The various aspects and embodiments provided in this disclosure are for purposes of illustration and are not intended to be limiting, with the true scope being indicated by the following claims, along with the full scope of equivalents to which the claims are entitled.

What is claimed is:

1. A method comprising:
providing, by one or more computing devices, a first Web page including an embedded viewer configured to render a three-dimensional (3D) object data model representing an object to present a first 3D view of the object, wherein the embedded viewer is operable to receive input to change the first 3D view of the object to a second 3D view of the object;
receiving, by the one or more computing devices, a request to provide the second 3D view of the object;
generating, by the one or more computing devices, a first uniform resource identifier that includes view information, the view information being a part of the first uniform resource identifier, the view information comprising a query determined by the input to change the first 3D view of the object to the second 3D view of the object, wherein the query is indicative of a size, an orientation, and a perspective of the object in the second 3D view; and
responsive to receiving a request based on the first uniform resource identifier, providing, by the one or more computing devices, a second Web page including an embedded viewer configured to render the 3D object data model according to the view information to present the second 3D view of the object.

2. The method of claim 1, wherein the first 3D view of the object presents a first plurality of orientations of the object, and the second 3D view of the object presents a second plurality of orientations of the object.

3. The method of claim 1, wherein the query includes one or more of a color, a background, a lighting condition, and a plurality of annotated features of the object.

4. The method of claim 1, wherein the view information includes a plurality of human-readable descriptors identifying the plurality of rendered features.

5. The method of claim 1, wherein:
the view information includes a unique string of information; and
generating the first uniform resource identifier includes generating the unique string of information based on the plurality of rendered features.

6. The method of claim 1, wherein the second 3D view of the object presents a first feature of the object, the method further comprising:
determining that the first feature is a target feature of the object; and
providing instructions to the second Web page to prioritize a rendering of the target feature.

7. The method of claim 6, wherein the view information includes an identifier corresponding to the target feature of the object.

8. The method of claim 1, further comprising identifying, based on a plurality of uniform resource identifiers including the first uniform resource identifier, at least one feature of the object that is represented by the plurality of uniform resource identifiers.

9. The method of claim 8, further comprising providing the first Web page such that the embedded viewer of the first Web page initially presents a third 3D view that presents the at least one feature of the object.

10. The method of claim 8, wherein identifying the at least one feature includes parsing the plurality of uniform resource identifiers to identify a string of information that is common to the plurality of uniform resource identifiers.

11. The method of claim 1, wherein at least one of the first 3D view of the object and the second 3D view of the object presents an exploded view of the object.

12. The method of claim 1, wherein the embedded viewer is configured to enable the object to be rotated by more than 180° about any of three orthogonal axes.

13. A non-transitory computer-readable medium storing instructions that, when executed by a computing device, cause the computing device to perform functions comprising:
providing a first Web page including an embedded viewer configured to render a three-dimensional (3D) object data model representing an object to present a first 3D view of the object, wherein the embedded viewer is operable to receive input to change the first 3D view of the object to a second 3D view of the object, the first 3D view being a different orientation of the object from the second 3D view;
receiving a request to provide the second 3D view of the object;
generating a first uniform resource identifier that includes view information, the view information being a part of the first uniform resource identifier, the view information comprising a query determined by the input to change the first 3D view of the object to the second 3D view of the object, wherein the query is indicative of a size, an orientation, and a perspective of the object in the second 3D view; and
responsive to receiving a request based on the first uniform resource identifier, providing a second Web page including an embedded viewer configured to render the 3D object data model according to the view information to present the second 3D view of the object.

14. The non-transitory computer-readable medium of claim 13, wherein the view information includes a human-readable descriptor corresponding to at least one of the plurality of rendered features.

15. The non-transitory computer-readable medium of claim 13, wherein the instructions are further executable by the computing device to perform functions comprising:
   parsing a plurality of uniform resource identifiers including the first uniform resource identifier to identify at least one feature that is represented by the plurality of uniform resource identifiers; and
   providing the first Web page such that the embedded viewer of the first Web page initially presents a third 3D view that presents the at least one feature.

16. The non-transitory computer-readable medium of claim 13, wherein:
   the second 3D view of the object presents a first feature of the object;
   the instructions are further executable by the computing device to perform functions comprising: (i) determining that the first feature is a target feature of the object, and (ii) providing instructions to the second Web page to prioritize a rendering of the target feature; and
   the view information includes an identifier corresponding to the target feature of the object.

17. The non-transitory computer-readable medium of claim 13, wherein the object includes multiple spaced apparatuses.

18. A system comprising:
   one or more databases storing a first Web page including an embedded viewer that is configured to render a three-dimensional (3D) object data model representing an object to present a first 3D view of the object, wherein the embedded viewer is operable to receive input to change the first 3D view of the object to a second 3D view of the object, the first 3D view being a different orientation of the object from the second 3D view;
   a communication interface configured to receive a first request to provide the second 3D view of the object and configured to receive a second request based on a first uniform resource identifier; and
   one or more non-transitory computer-readable media storing instructions that, when executed by one or more processors, cause the one or more processors to:
      in response to the communication interface receiving the first request, send the first uniform resource identifier to the communication interface, wherein the first uniform resource identifier includes view information, the view information being a part of the first uniform resource identifier, the view information comprising a query determined by the input to change the first 3D view of the object to the second 3D view of the object, wherein the query is indicative of a size, an orientation, and a perspective of the object in the second 3D view; and
      in response to the communication interface receiving the second request, send the first Web page to the communication interface so that the embedded viewer is operable to render the 3D object data model according to the view information to present the second 3D view of the object.

19. The system of claim 18, wherein the object is a portable object.

* * * * *